United States Patent [19]

Suzuki et al.

[11] Patent Number: 5,032,931
[45] Date of Patent: Jul. 16, 1991

[54] METHOD FOR MAGNETIC TRANSFER AND APPARATUS THEREFOR

[75] Inventors: Toshiyuki Suzuki; Masanori Isshiki, both of Yokohama, Japan

[73] Assignee: Kabushiki Kaisha Toshiba, Kanagawa, Japan

[21] Appl. No.: 517,534

[22] Filed: Apr. 25, 1990

Related U.S. Application Data

[63] Continuation of Ser. No. 143,939, Jan. 14, 1988, abandoned.

[30] Foreign Application Priority Data

Jan. 19, 1987 [JP] Japan .................................. 62-9490

[51] Int. Cl.$^5$ .............................................. G11B 5/86
[52] U.S. Cl. .................................................... 360/17
[58] Field of Search ........................................ 360/17

[56] References Cited

U.S. PATENT DOCUMENTS

| | | | |
|---|---|---|---|
| 3,676,612 | 7/1972 | Kobayashi et al. | 360/16 |
| 3,913,131 | 10/1975 | Kitamoto et al. | 360/17 |
| 3,982,276 | 9/1976 | Roos | 360/17 |
| 4,277,806 | 7/1981 | Jeffers et al. | 360/17 |

FOREIGN PATENT DOCUMENTS

| | | |
|---|---|---|
| 020847 | 1/1987 | European Pat. Off. |
| 2156869 | 9/1973 | France . |
| 52-46801 | 11/1977 | Japan . |
| 57-120233 | 7/1982 | Japan . |
| 62-1123 | 1/1987 | Japan . |

OTHER PUBLICATIONS

Magnetic Recording, Technology, Editors C. D. Mee and E. D. Daniel, McGraw-Hill Book Company, vol. 1, pp. 56-66.

"Magnetization Transitions in Perpendicular Magnetic Recording", by T. Suzuki and S. Iwasaki, IEEE Transactions on Magnetics, vol. Mag-18, No. 2, Mar. 1982.

Primary Examiner—Vincent P. Canney
Attorney, Agent, or Firm—Finnegan, Henderson Farabow, Garrett, and Dunner

[57] ABSTRACT

A method for contact magnetic printing of recorded information is disclosed which comprises keeping in intimate mutual contact the magnetic surface of a recorded master magnetic recording medium and the magnetic surface of a blank slave magnetic recording medium which uses hexagonal ferrite magnetic particles as the magnetic material, controlling the temperature of the two-magnetic recording media so as to lower the coercive force of the slave magnetic recording medium relative to that of the master magnetic recording medium, and applying an external magnetic field thereto thereby causing the recorded information to be magnetically printed from the master magnetic recording medium to the slave magnetic recording medium. In accordance with this method, copies of pictures of high quality and sounds of highly desirable high-frequency characteristics can be produced by the contact magnetic printing technique using the slave magnetic recording medium possessing a coercive force equal to or greater than the coercive force of the master magnetic recording medium.

6 Claims, 4 Drawing Sheets

METHOD FOR MAGNETIC TRANSFER AND APPARATUS THEREFOR

This application is a continuation, of application Ser. No. 07/143,939, filed Jan. 14, 1988 now abandoned.

The present application claims priority of Japanese Patent Application No. 62-9490 filed on Jan. 19, 1987.

FIELD OF THE INVENTION AND RELATED ART STATEMENT

This invention relates to a method for contact magnetic printing, i.e., transfer of information recorded in a master magnetic recording medium to a blank slave magnetic recording medium, and an apparatus for effecting the method, and more particularly to a method for contact magnetic printing which permits transfer of information from a master magnetic recording medium to a slave magnetic recording medium possessing a coercive force equal to or larger than the coercive force of the master magnetic recording medium and an apparatus for effecting the method.

The rapid growth of the information society and the extensive dissemination of magnetic recording devices in recent years have been inducing a sharp increase in the demand for magnetic tapes containing music and other various forms of information and have been imparting a steadily growing commercial value to these magnetic tapes. One method of copying a recorded magnetic tape, which is now widely in use consists of transferring recorded information at an equal speed or an accelerated speed from one VTR (or audio recorder) as an original source to a plurality of copying VTR's (or audio recorders). This method requires no special apparatus and permits construction of a copying system by suitable combination of a plurality of commercially available VTR's or audio recorders or their modifiers. This method nevertheless has the disadvantage that the number of copying devices which can be effectively connected to one VTR as an original source is limited and, therefore, the efficiency of copy production cannot be increased indefinitely. Further, this method has another disadvantage that, since it is difficult for the plurality of copying devices used in the system to maintain uniform quality, the tapes obtained by this method of copying inevitably vary in quality and fail to offer copies of uniform, quality.

Another method of copying a recorded magnetic tape which has found widespread recognition effects rapid volume production of copy tapes by transporting the filled master tape and a blank slave tape in such a manner that their magnetic surfaces are held in mutual contact and applying an AC magnetic field to the magnetic tapes being advanced in a state of intimate contact thereby allowing the information recorded in the magnetic surface of the master tape to be magnetically recorded to the magnetic surface of the slave tape.

Though this method permits collective production of a large volume of copies, it has the drawback that the coercive force of slave tapes must be decreased to one quarter to one third of the coercive force of the master tape.

In terms of the hysteresis curve illustrated in FIG. 1, this statement is equivalent to the following expression:

$$H_1 \text{ (master)} > H_c > H_2 \text{ (slave)}$$

(wherein $H_1$ stands for the magnetic field at the knee, $H_c$ for the coercive force, and $H_2$ for the saturation magnetic field). Since the following ranges generally prevail, $$H_1 = (0.5 \sim 0.6) \times H_c$$

$$H_2 = (1.4 \sim 1.5) \times H_c$$

the foregoing expression may be rewritten as follows:

$$H_c \text{ (master)} > (2.3 \sim 3.0) \times H_c \text{ (slave)}$$

The upper limit of the coercive force of the master tape available for the operation in question is determined by the capability of a magnetic head serving to record information on the master tape and generally falls in the range of 2,000 to 2,200 Oe. The coercive force which the slave tape is allowed to assume in this case is about 700 Oe.

The $\Xi$-$Fe_2O_3$ and Co-$\Xi$-$Fe_2O_3$ tapes which have been in widespread use suffer degradation of high-density recording property as their coercive forces are lowered. When a given master tape is copied to these conventional tapes as slave tapes, there inevitably entails a disadvantage that the high frequency sound characteristic of the audio information is impaired. Any effort to preclude this impairment of the high frequency sound characteristic requires using slave tapes of higher coercive forces and consequently for using a master tape of a proportionately higher coercive force. An effort to record a master signal to the master tape of such a high coercive force as mentioned above causes the disadvantage that the magnetic head undergoes the phenomenon of core saturation and becomes incapable of recording the master signal with ample intensity.

Where a Ba ferrite perpendicular recording medium is employed as a slave tape, the high-density recording property is not impaired even when the coercive force is changed from 2,000 Oe to about 600 Oe. Again in this case, there persists a drawback that the magnetic head succumbs to the phenomenon of core saturation because the coercive force of the master tape must be increased to 2.5 to 3 times that of the slave tape.

The method for magnetic recording which uses a master magnetic recording medium containing Co and a slave magnetic recording medium possessing a layer of magnetic alloy material formed mainly with Mn and Bi and effects transfer of the signal with the magnetic recording media kept at a low temperature has been known to the art (Japanese Patent Publication SHO 52(1977)-46,801. Since the slave magnetic recording medium uses a Mn-Bi system alloy, this method requires to keeping the recording media cooled to below such an extremely low temperature as 120° K. ($-150°$ C. that is not practicable. Moreover, such slave magnetic recording media have a drawback that since recording takes place by domain wall motion, it is difficult to attain high resolution.

Since the conventional magnetic contact printing methods require keeping the coercive forces of slave tapes below one fourth to one third of the coercive force of the master tape as described above, they are compelled to use low coercive forces and consequently prevent producing copies of pictures of high quality and sound with satisfactory high-frequency characteristics. The transfer method resorting to control of temperature is impracticable because the cooling temperature is too low.

OBJECT AND SUMMARY OF THE INVENTION

This invention has been produced for the purpose of eliminating the various drawbacks of the prior art mentioned above. An object of this invention is to provide a method for magnetic printing which enables copies of pictures of high quality and sound with satisfactory high-frequency characteristics to be produced with high efficiency by using a slave magnetic recording medium possessing a coercive force temperature coefficient equal to or larger than the coercive force temperature coefficient of the master magnetic recording medium.

Another object of this invention is to provide an apparatus to be used in working the method described above.

The other objects of this invention will become apparent from the following description of the invention.

In the operation of effecting magnetic printing by keeping the magnetic surface of the recorded master magnetic medium and the magnetic surface of the blank slave magnetic recording medium in mutual contact and causing the recorded information in the master magnetic recording medium to be printed onto the slave magnetic recording medium by application of an external magnetic field, the present invention contemplates effecting the magnetic printing by using hexagonal ferrite magnetic particles or ferrite particles with hexagonal structure as the magnetic material for the aforementioned slave magnetic recording medium and controlling the temperature so as to lower the coercive force of the slave magnetic recording medium with respect to that of the master magnetic recording medium.

As the master magnetic recording medium for use in the present invention, a vacuum deposited tape or a metal tape is suitable. As the slave magnetic recording medium, a hexagonal ferrite tape such as a Ba ferrite tape is suitable. Any of the hexagonal ferrite tapes which are disclosed in Japanese Patent Application Disclosure SHO 55(1980)-86,103 and Japanese Patent Application Disclosure SHO 56(1981)-61,101, for example, can be advantageously used.

The coercive force of the substituted hexagonal ferrite varies in proportion to the amount of substitution, as illustrated in FIG. 2 which uses hexagonal ferrite magnetic particles as the magnetic material.

The magnetic recording medium of a desired coercive force, therefore, can be obtained by varying the amount of substitution to suit the demand.

The temperature coefficients of coercive force of typical magnetic recording media and the typical coercive forces exhibited by the magnetic media at normal room temperature are as follows.

| Medium | $H_c$ Temp. Coeff. (Oe) | Typical $H_c$ value (Oe) |
|---|---|---|
| Metal (powder) | $-2.5 \sim -1$ | $1400 \sim 2200$ |
| Metal (evaporated) | $-5 \sim -2$ | $1400 \sim 2200$ |
| Co-ν-Fe$_2$O$_3$ | $-5 \sim -2$ | $600 \sim 700$ |
| Ba-ferrite | $+2.5 \sim +5$ | $600 \sim 750$ |

In the combinations of magnetic recording media as mentioned above, the coercive force of the master magnetic recording medium can be increased and the coercive force of the slave magnetic recording medium can be decreased by cooling to a low temperature. The low temperature is desired to fall in the range of the room temperature to $-100°$ C., preferably $0°$ to $-20°$ C.

When a particle coated magnetic recording medium is used as the slave magnetic recording medium, the desirable flexibility of the medium enhances the efficiency of high-density signal printing.

In accordance with the present invention, by using a slave magnetic recording medium possessing a greater temperature coefficient of coercive force than that of a master magnetic recording medium and cooling the recording medium to a low temperature, for example, the coercive force of the slave magnetic recording medium can be lowered relative to that of the master magnetic recording medium. By carrying out the magnetic printing in the state described above, therefore, copied magnetic recording media of high quality can be obtained efficiently.

DETAILED DESCRIPTION OF PREFERRED EMBODIMENT

Now, a preferred embodiment of the present invention will be described below with reference to the accompanying drawings.

Figure 3:
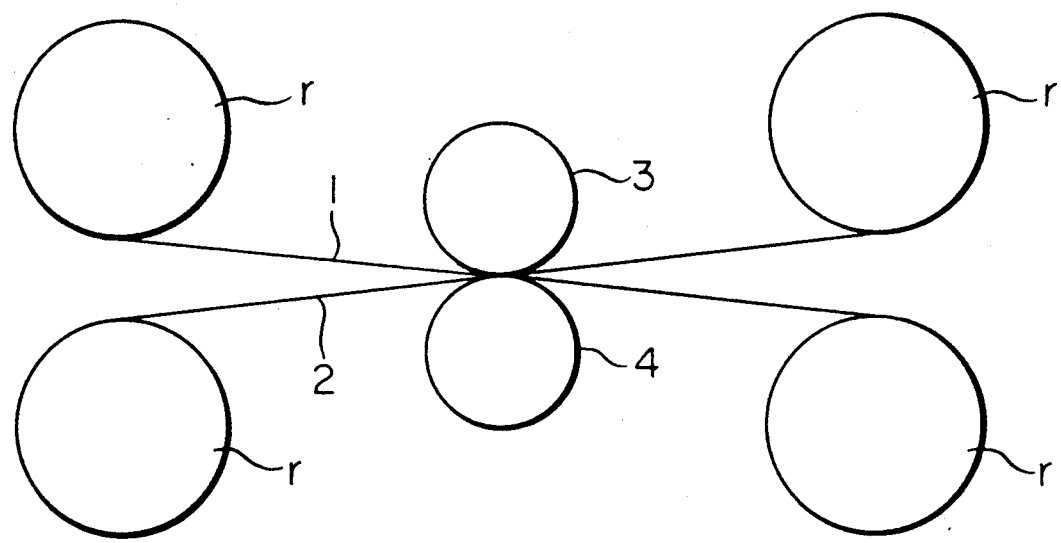
FIG. 3, FIG. 5, and FIG. 6 are diagrams schematically illustrating working examples of the present invention.
Figure 4:
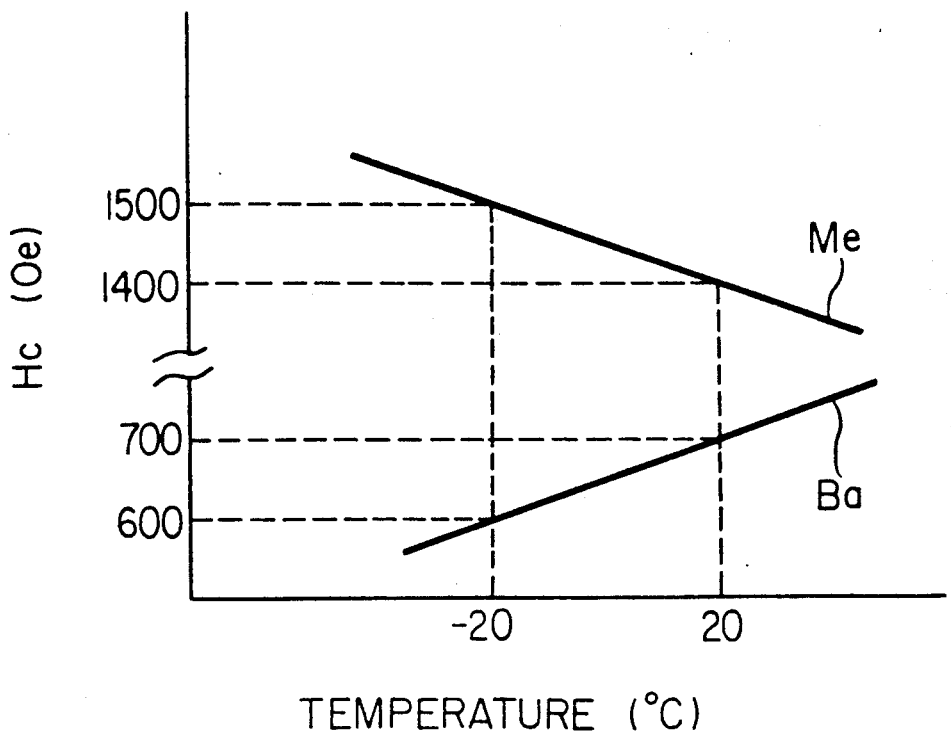
FIG. 4 is a graph showing the temperature characteristic of coercive force of the magnetic recording medium for illustrating of the principle of the present invention.

FIG. 3 illustrates one embodiment of the present invention which effects magnetic printing by using a metal tape as a master tape 1 and a ferrite tape as a slave tape 2. As illustrated in FIG. 4, the coercive force of the metal tape Me possesses a negative temperature coefficient and the coercive force of the Ba ferrite tape a positive temperature coefficient.

In the present embodiment, since the master tape (metal particulate tape) exhibits a coercive force, $H_c$, of 1,400 Oe at normal room temperature (20° C.), it is possible to record a master signal with a conventional metal head.

Magnetic printing is effected by keeping the magnetic surfaces of the two magnetic tapes in mutual contact and passing them between a magnetic printing head 3 and a roller which are both cooled wholly to $-20°$ C., for example, with a cooling device which is not shown in the diagram.

When cooled to this temperature the coercive force ($H_c$) of the master tape (metal particulate tape) 1 is 1,500 Oe and that ($H_c$) of the slave tape (Ba ferrite tape) 2 is 600 Oe, the ratio being 2.5. In this state, the printing AC magnetic field produced from a magnetic circuit disposed inside the magnetic printing head 3 acts, on the slave tape 2 and effects magnetic printing of the signal from the master tape 1 to the slave tape 2 in high efficiency. The symbol "r" denotes a reel.

Generally, the coercive force, $H_c$ (master), of the master tape and the coercive force, $H_c$ (slave), of the slave tape are desired to satisfy the following relation:

$$H_c(master) > (2.3 \sim 3.0) \times H_c(slave)$$

Figure 1:
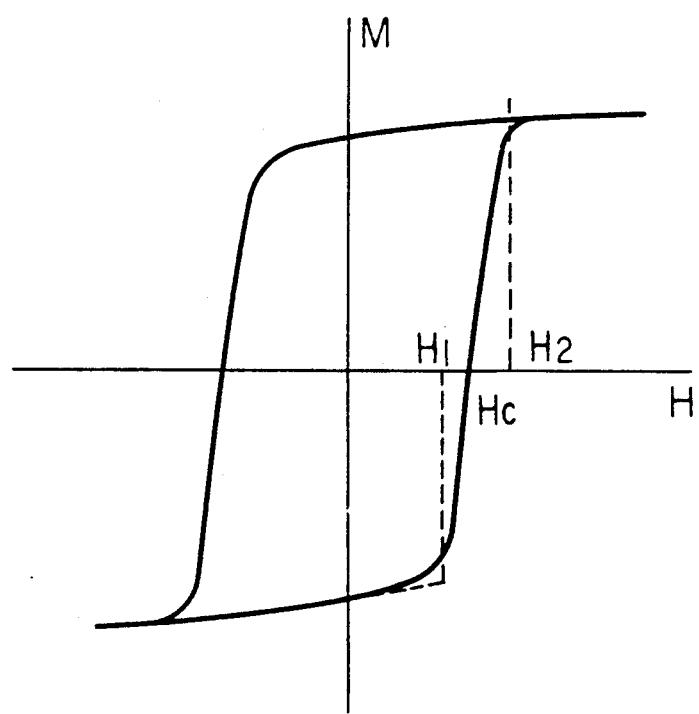
FIG. 1 illustrates a hysteresis curve of a magnetic recording medium.
Figure 2:
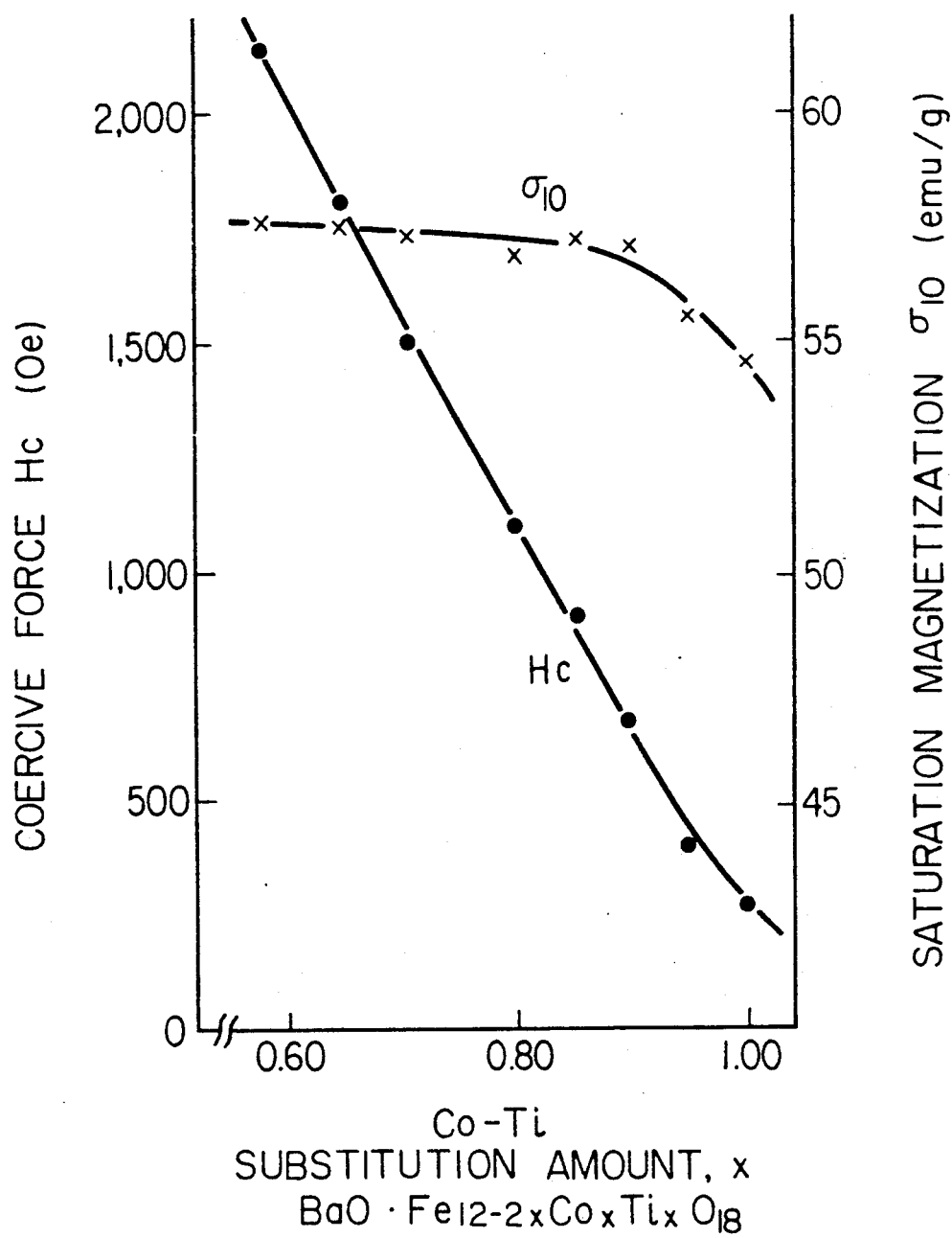
FIG. 2 is a graph showing the relation between the amount of substitution of a substituted ferrite and the magnitudes of saturated magnetization and coercive force.

When the slave tape 2 onto which the signal has been magnetically printed as described above is replayed at room temperature, the coercive force ($H_c$) of the slave tape 2 reaches 700 Oe as noted from FIG. 2 so that the slave tape is allowed to retain its highly desirable high-density characteristic.

Figure 5:
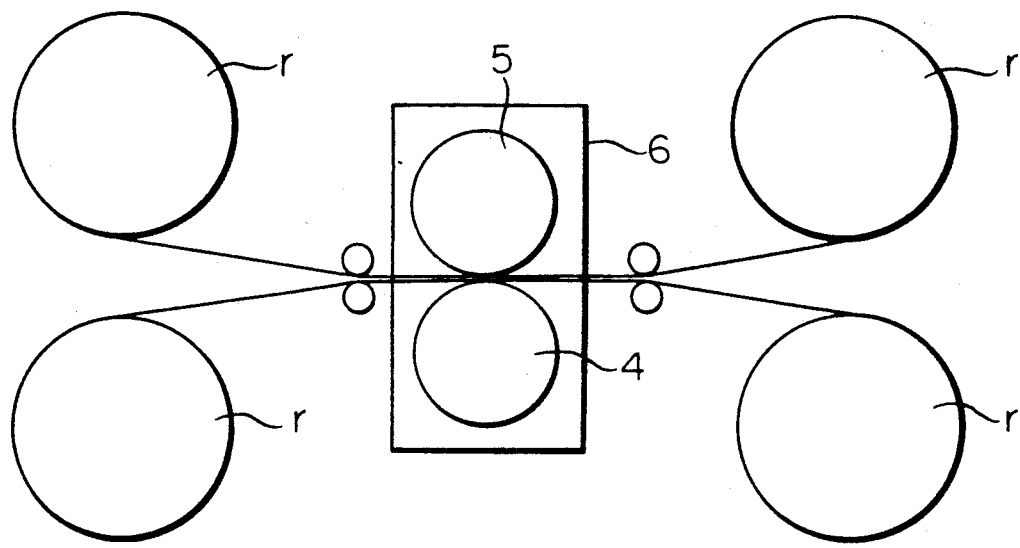

FIG. 5 illustrates another embodiment of the present invention. In the drawings, the components having their equivalents indicated in FIG. 3 are denoted by like symbols. In the present embodiment, a cooling house 6 encloses a roller 4 and an ordinary magnetic printing head 5 so as to cool them wholly therein.

Figure 6:
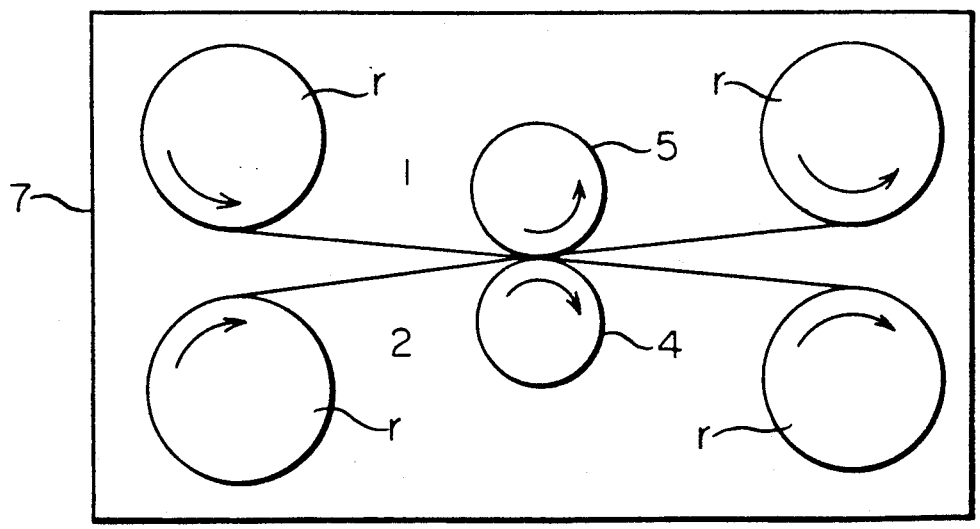

FIG. 6 illustrates yet another embodiment of the present invention. The apparatus in this embodiment has the printing device wholly enclosed within a cooling house 7 so as to cool the printing device therein.

The preceding embodiments represent cases wherein the coercive force ($H_c$) of the master tape 1 possesses a negative temperature coefficient and the coercive force ($H_c$) of the slave tape 2 a positive temperature coefficient respectively. This invention need not be limited to these embodiments. This invention can be embodied as effectively in a case wherein the temperature coefficients of the two coercive forces ($H_c$) have the same polarity, as long as the temperature coefficient of coercive force ($H_c$) of the slave tape is greater than that of coercive force ($H_c$) of the master tape.

As described above, the present invention uses a slave magnetic recording medium possessing a temperature coefficient of coercive force different from that of the master magnetic recording medium and carries out the magnetic printing by controlling the temperature in such a manner as to lower the coercive force of the slave magnetic recording medium relative to that of the master magnetic recording medium. Thus, the present invention permits copies of pictures of high quality or sounds of highly desirable high-frequency characteristics to be produced with high efficiency by the use of the slave magnetic recording medium possessing a coercive force equal to or larger than that of the master magnetic recording medium at room temperature.

What is claimed is:

1. An apparatus for contact magnetic printing, comprising:
    first feeding means for feeding a master magnetic recording medium;
    second feeding means for feeding a slave magnetic recording medium;
    means for retaining in intimate contact the magnetic surfaces of said master magnetic recording medium and said slave magnetic recording medium in a region wherein said two media are kept at a low temperature and an external magnetic field is applied thereto;
    means for controlling said master magnetic recording medium and said slave magnetic recording medium held intimate contact at a low temperature, said controlling means comprising a cooled magnetic printing head and a cooled roller disposed in close proximity so as to nip said two magnetic recording media therebetween;
    means for applying an external magnetic field to said magnetic recording media thereby effecting magnetic printing;
    first take-up means for taking up said master magnetic recording medium; and
    second take-up means for taking up said slave magnetic recording medium.

2. The apparatus according to claim 1, wherein said retaining means comprises a magnetic printing head and a roller disposed in close proximity to each other so as to nip said two magnetic recording media therebetween.

3. An apparatus for contact magnetic printing, comprising:
    first feeding means for feeding a master magnetic recording medium;
    second feeding means for feeding a slave magnetic recording medium;
    means for retaining in intimate contact the magnetic surfaces of said master magnetic recording medium and said slave magnetic recording medium in a region wherein said two media are kept at a low temperature and an external magnetic field is applied thereto;
    means for controlling said master magnetic recording medium and said slave magnetic recording medium held in intimate mutual contact at a low temperature, said controlling means comprising a cooling house enclosing said retaining means;
    means for applying an external magnetic field to said magnetic recording media thereby effecting magnetic printing;
    first take-up means for taking up said master magnetic recording medium; and
    second take-up means for taking up said slave magnetic recording medium.

4. The apparatus according to claim 3, wherein said retaining means comprises a magnetic printing head and a roller disposed in close proximity to each other so as to nip said two magnetic recording media therebetween.

5. An apparatus for contact magnetic printing, comprising:
    first feeding means for feeding a master magnetic recording medium;
    second feeding means for feeding a slave magnetic recording medium;
    means for retaining in intimate contact the magnetic surfaces of said master magnetic recording medium and said slave magnetic recording medium in a region wherein said two media are kept at a low temperature and an external magnetic field is applied thereto;
    means for applying an external magnetic field to said magnetic recording media thereby effecting magnetic printing;
    first take-up means for taking up said master magnetic recording medium;
    second take-up means for taking up said slave magnetic recording medium; and
    means for controlling said master magnetic recording medium held in intimate mutual contact at a low temperature, said controlling means comprising a cooling house wholly enclosing therein said first and second feeding means, said retaining means, and said first and second take-up means.

6. The apparatus according to claim 5, wherein said retaining means comprises a magnetic printing head and a roller disposed in close proximity to each other so as to nip said two magnetic recording media therebetween.

* * * * *